(12) United States Patent
Boudreau et al.

(10) Patent No.: US 8,074,943 B2
(45) Date of Patent: *Dec. 13, 2011

(54) PIPE PROTECTOR

(76) Inventors: Martin Boudreau, Boisbriand (CA);
Jean-Pierre Thibault, Terrebonne (CA)

( * ) Notice: Subject to any disclaimer, the term of this patent is extended or adjusted under 35 U.S.C. 154(b) by 111 days.

This patent is subject to a terminal disclaimer.

(21) Appl. No.: 12/148,862

(22) Filed: Apr. 23, 2008

(65) Prior Publication Data
US 2008/0265106 A1    Oct. 30, 2008

Related U.S. Application Data

(63) Continuation-in-part of application No. 10/966,568, filed on Oct. 15, 2004, now abandoned.

(30) Foreign Application Priority Data

Oct. 17, 2003  (CA) ...................................... 2445498

(51) Int. Cl.
*E21F 17/02* (2006.01)

(52) U.S. Cl. ............. 248/58; 248/72; 248/65; 174/40 R; 174/84 C

(58) Field of Classification Search ..................... 248/72, 248/74.2, 316.1, 316.7, 228.6, 228.7, 230.6, 248/230.7, 231.71, 231.81, 229.15, 65, 75, 248/58, 62; 24/455, 545, 519, 520; 174/84 C, 174/40 R See application file for complete search history.

(56) References Cited

U.S. PATENT DOCUMENTS

| | | | | | |
|---|---|---|---|---|---|
| 3,185,763 | A | * | 5/1965 | Harmon | 174/144 |
| 3,778,537 | A | * | 12/1973 | Miller | 174/138 R |
| 4,017,046 | A | * | 4/1977 | Hicks | 248/55 |
| D306,553 | S | * | 3/1990 | Rumpel | D8/395 |
| 5,762,300 | A | * | 6/1998 | Sorkin | 248/78 |
| 6,182,930 | B1 | * | 2/2001 | Lindborg | 248/49 |
| D438,453 | S | * | 3/2001 | Nelson et al. | D8/395 |
| 6,378,811 | B1 | * | 4/2002 | Potter et al. | 248/68.1 |
| 6,592,082 | B1 | * | 7/2003 | Fear et al. | 248/72 |
| 6,860,515 | B2 | * | 3/2005 | Inoue | 285/93 |
| 7,131,170 | B2 | * | 11/2006 | Weaver | 24/545 |

* cited by examiner

*Primary Examiner* — Terrell Mckinnon
*Assistant Examiner* — Todd M. Epps
(74) *Attorney, Agent, or Firm* — Eric Fincham

(57) ABSTRACT

A pipe support which comprises a body having a recess of a generally U-shaped configuration formed therein, the recess being opened at a top end, the body having a clamping portion extending downwardly and which clamping portion includes first and second resilient members which each comprise a vertical sidewall and an inwardly extending end segment. The pipe support is particularly suitable for use on various structural members.

10 Claims, 4 Drawing Sheets

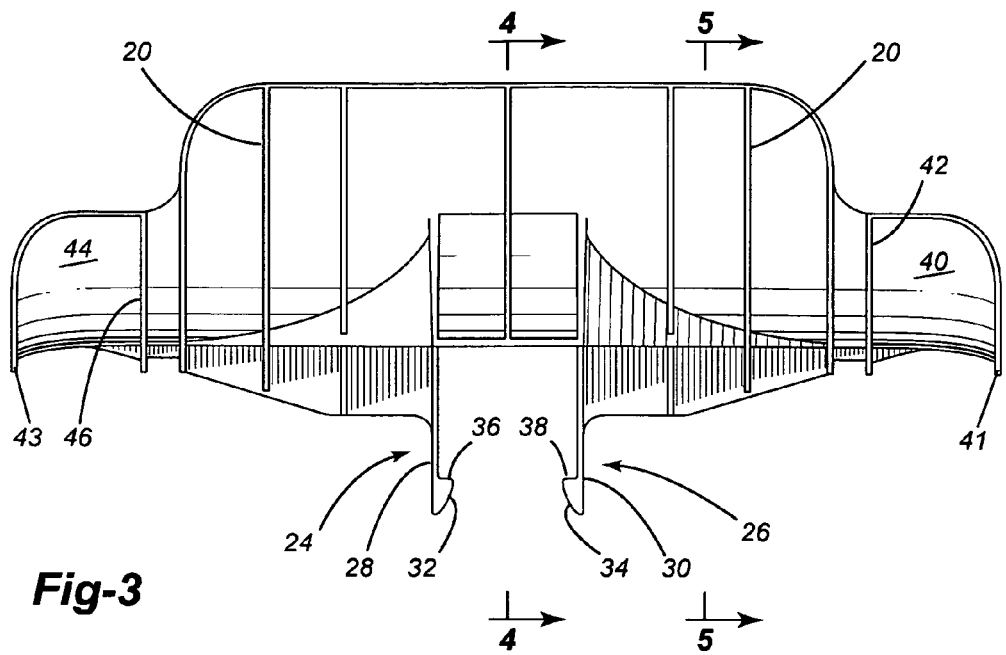
*Fig-3*
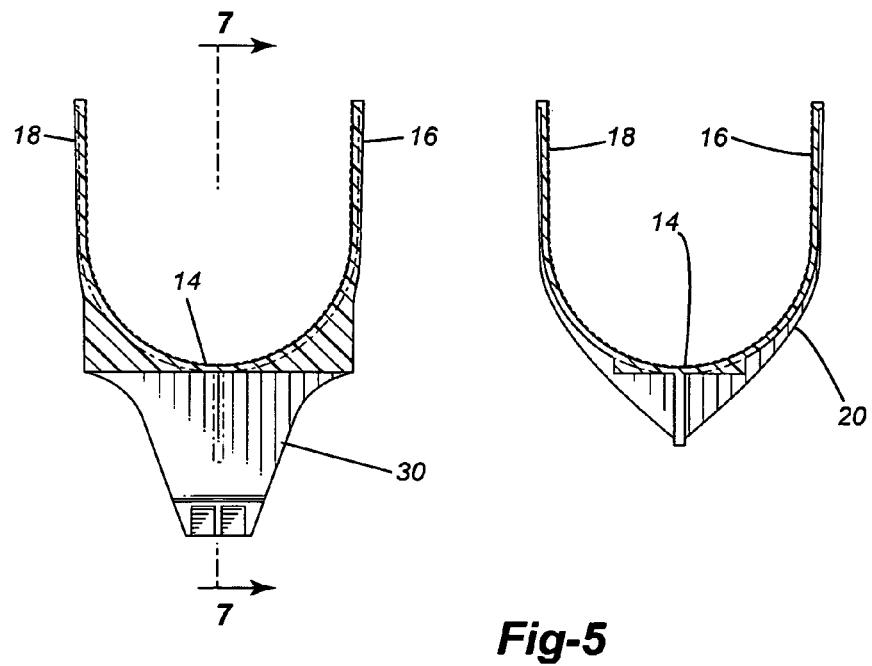
*Fig-4*  *Fig-5*

PIPE PROTECTOR

The present application is a continuation in part of application Ser. No. 10/966,568 filed Oct. 15, 2004 now abandoned.

FIELD OF THE INVENTION

The present invention relates to a pipe support system.

BACKGROUND OF THE INVENTION

In the installation of pipes and the like in various types of buildings and in particular pipes associated with air conditioning, refrigeration and heating, such as may be employed in commercial and industrial establishments, conventional practice is that the pipes are hung from the ceiling by strap hangers.

The most common type of strap hanger employed in the industry comprises a metal strap having apertures for fastening purposes. The strap is looped about the pipe to be secured and then a fastening member such as a screw or the like is secured to a substrate such as a beam or rafter through the apertures.

This conventional means of fastening pipes suffers from several disadvantages. Initially, each pipe must be installed individually and as such, the installation process is relatively labour intensive. Secondly, the hangers can cause the rupturing of the pipes after a period of time. This would occur due to movement of the pipe within the pipe hanger and subsequent surface damage. The movement will occur either due to mechanical vibrations, and/or to a thermal expansion and contraction.

There have been various proposals in the art for pipe support systems to overcome the above disadvantages. Thus, U.S. Pat. No. 2,273,571 discloses an arrangement wherein one may use a hanger construction which includes the use of a plurality of pipe holders which are movably mounted on a fixed rail.

A further arrangement is shown in U.S. Pat. No. 4,245,806 wherein there is provided a vertically threaded shaft to receive pipe support members of various configurations which are attachable thereto.

U.S. Pat. No. 4,925,136 shows a somewhat similar arrangement wherein there is provided a vertically threaded rod or shaft along with hanger members may be secured thereto.

SUMMARY OF THE INVENTION

It is an object of the present invention to provide a pipe support system which utilises a minimum of components and tooling while being adaptable for many different pipes and set-ups.

According to one aspect of the present invention, there is provided a pipe support comprising a body having a recess formed therein, the recess having a generally U-shaped configuration and being open at a top end thereof, the recess being defined by a bottom wall and first and second sidewalls, a clamping portion extending downwardly from the body, the clamping portion comprising first and second resilient members, each of the first and second resilient members comprising a vertical sidewall and an inwardly extending end segment, the vertical sidewalls extending transversely with respect to said sidewalls defining the recess.

In a further aspect of the present invention, in a building having a plurality of pipes and longitudinally extending truss members, the improvement comprising a pipe support assembly secured to at least one of the truss members, the pipe support assembly comprising a body having a plurality of recesses formed therein, the recesses each being of a generally U-shaped configuration and being open at a top end thereof, each of the recesses being defined by bottom wall and first and second sidewalls, the recesses being in a side by side relationship, at least one clamping portion extending downwardly from the body, the clamping portion comprising first and second resilient members, each of the first and second resilient members comprising a vertical sidewall and an inwardly extending end segment, the vertical sidewalls extending transversly with respect to the sidewalls defining the recess.

The pipe support member of the instant invention is designed to support insulated pipes—i.e. the pipe has a layer of insulation wrapped thereabout. Thus, it is important to minimize potential damage to the insulation when it sits within the pipe support member.

To this end, at both ends of the pipe support member, there is preferably provided an arrangement wherein the inner surface of the tongues slope downwardly and are terminated by rounded lips. The extended tongues and lips are shaped to allow linear movement of the pipe during expansion and contraction such that the insulated material thereabout is not subject to tearing and breakage.

In a further preferred aspect, the interior wall of the pipe support member preferably has a textured finish which creates a film of air between the pipe support holder and pipe insulation material to facilitate linear movement of the pipe with its insulation material within the member. The length of the pipe support member may be designed to prevent compression of the insulation material.

The pipe support member described above overcomes many of the disadvantages of the prior art. Thus, traditionally linear movement of the pipe (due to thermal expansion or contraction) can lead to damage to the insulation surrounding the pipe. Indeed, it is known that many pipes will develop leaks due to the copper line being in direct contact with the metal hanger. These leaks are often difficult to locate and result in expensive repairs.

BRIEF DESCRIPTION OF THE DRAWINGS

Having thus generally described the invention, reference will be made to the accompanying drawings illustrating an embodiment thereof, in which:

FIG. 3 is a side elevational view thereof;

FIG. 4 is a cross sectional view taken along the lines 4-4 of FIG. 3;

FIG. 5 is a cross sectional view taken along the lines 5-5 of FIG. 3;

DESCRIPTION OF THE PREFERRED EMBODIMENTS

Figure 1:
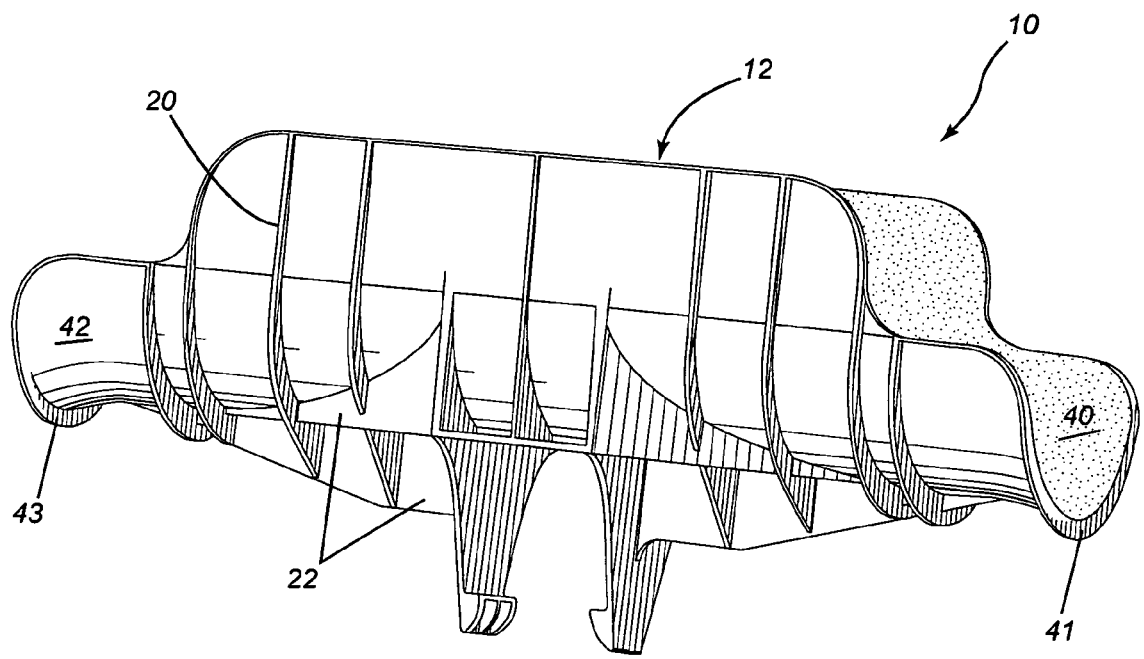
FIG. 1 is a first perspective view of a pipe support member according to an embodiment of the present invention and illustrating the bottom and side thereof.
Figure 2:
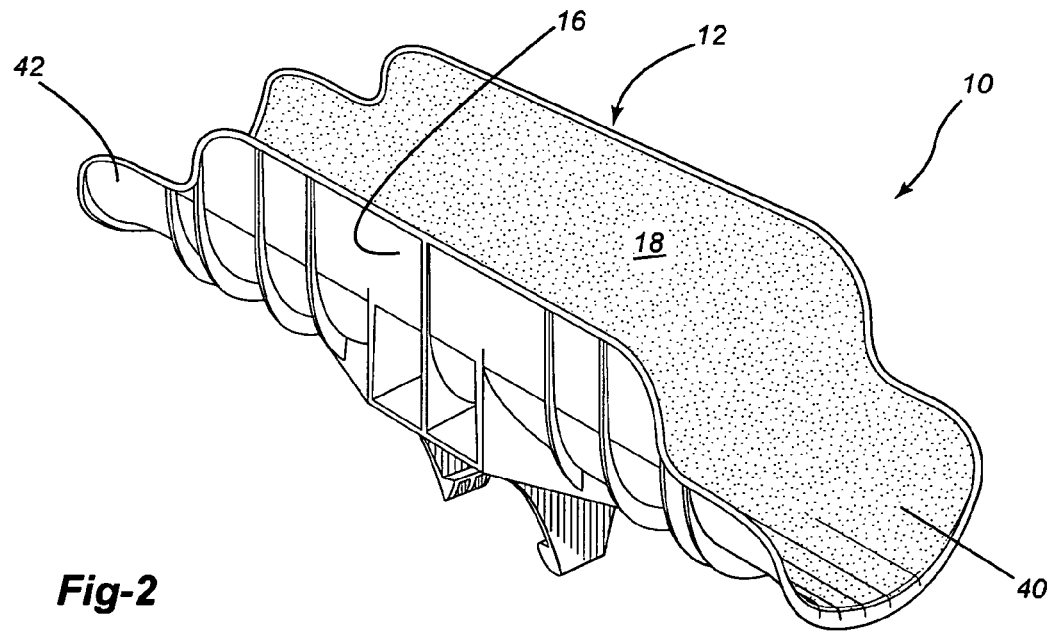
FIG. 2 is a perspective view of the pipe support member of FIG. 1 illustrating a side and inner portion thereof.
Figure 6:
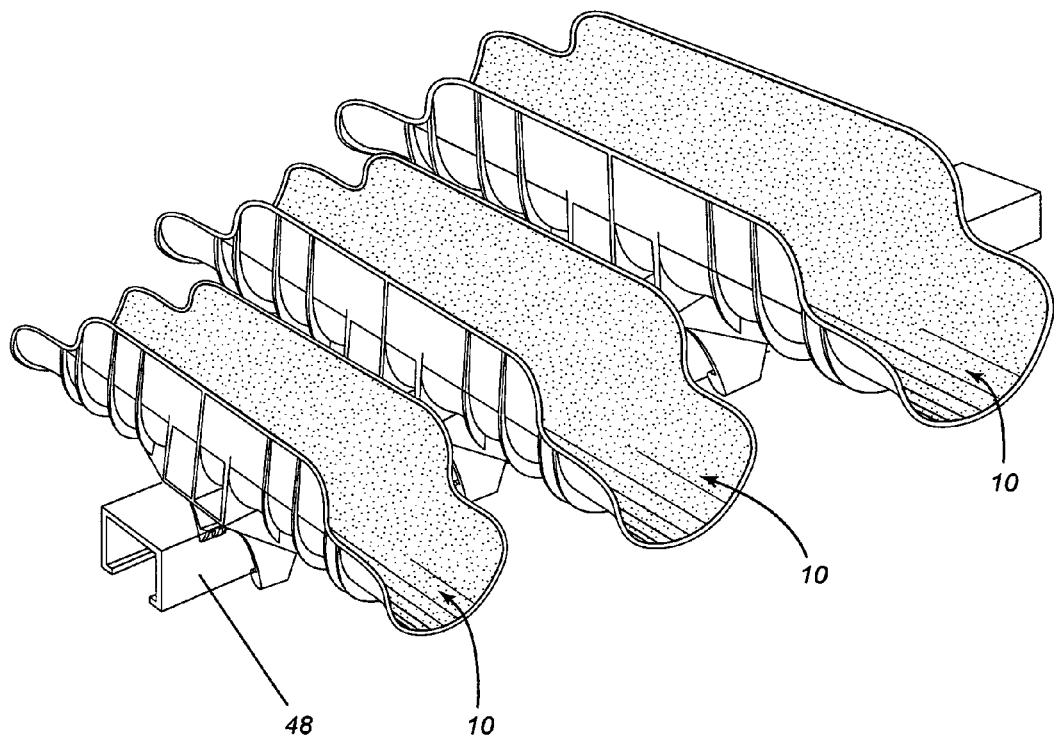
FIG. 6 is a perspective view of a plurality of pipe support members mounted on a structural member.

Referring to the drawings in greater detail and by reference characters thereto, there is illustrated a pipe support member which is generally designated by reference numeral 10.

Pipe support member 10 includes a central body portion generally designated by reference numeral 12 and which comprises a bottom wall 14 which is of an arcuate configuration and upwardly extending sidewalls 16 and 18.

On the exterior facing surface of bottom wall 14 and sidewalls 16, 18, there are spaced transverse flanges 20. Flanges are also provided along the longitudinal extending flanges 22, three such flanges being illustrated.

The pipe support member 10 is designed to be attached to a truss type support and to this end, there are provided a pair of fastening or clamping members generally designated by reference numerals 24 and 26. Fastening members 24, 26 each have a respective sidewall 28, 30 which extends outwardly from the bottom wall 14. Each sidewall 28, 30 in turn has respective inwardly extending end segments 32, 34. End segments 32, 34 have a respective end wall 36, 38 such that there is defined therebetween a recess-designed to engage a truss member. Naturally, it will be understood that sidewalls 28, 30 are somewhat flexible or resilient.

Figure 7:
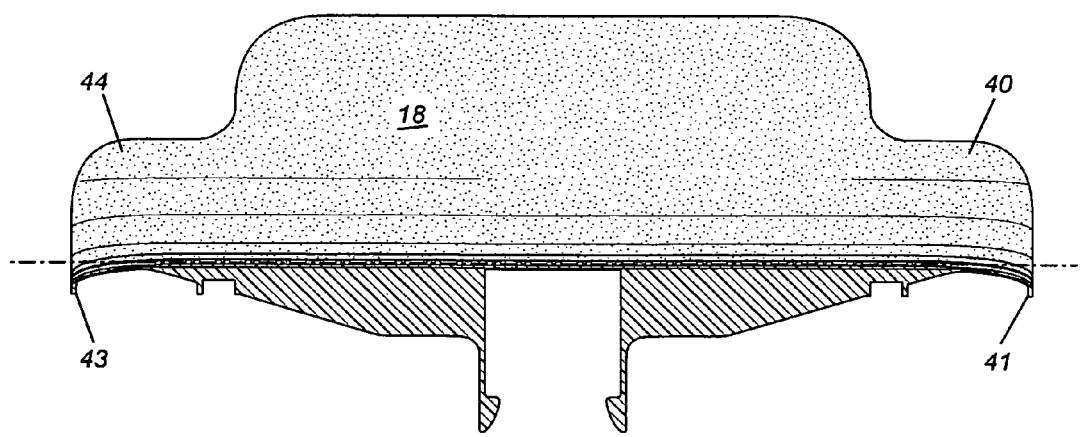
FIG. 7 is a longitudinal section view of the pipe support member.

At one end of pipe support member 10, there is provided an extended tongue portion generally designated by reference numeral 40, and which has a reinforcing rib 42 extending thereabout. Similarly, at the opposed end of central body portion 12, there is provided a second extended tongue 44 having associated rib 46. Each of tongue portions 40, 44 is characterized by a sidewall which is of a lesser height than a central portion of the side walls. As seen in FIG. 7, tongues 40 and 44 have an upper or inner surface which tapers slightly downwardly. This arrangement diminishes the risk of the tearing of the pipe insulation during movement caused by expansion and contraction. Each tongue 40, 42 terminates in a rounded lip 41, 43 respectively.

Also, as may be seen in the drawings, the pipe contacting surfaces of member 10 have a textured finish. This helps to create a thin film of air between the pipe support member and the pipe insulation material to facilitate linear movement of the pipe with this insulation within the support member.

Naturally, it will be understood that the pipe support member 10 may be made in varying sizes depending upon the particular pipe or conduit which is to be supported. Similarly, the pipe support member 10 can be made of differing materials with a plastic material such as polypropylene being preferred.

Figure 8:
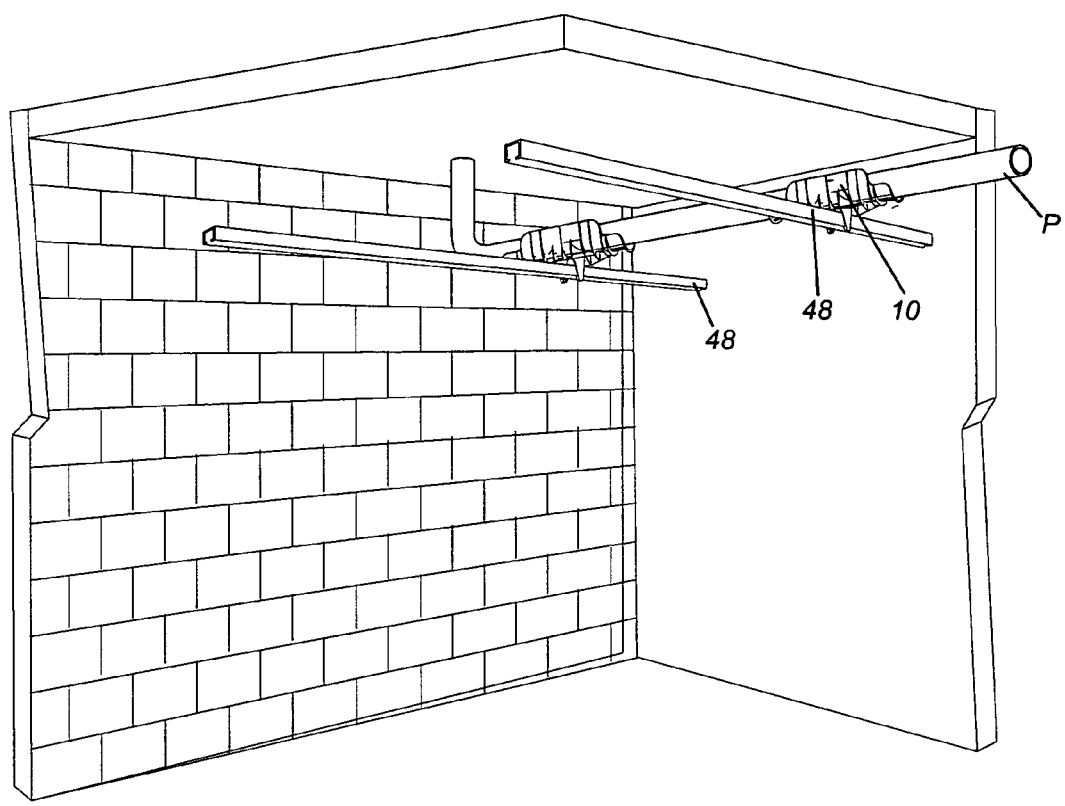
FIG. 8 is a perspective view illustrating use of the pipe support member in a building.

As shown in FIG. 8, the pipe support members 10 are secured to trusses 48 and are designed to support a pipe P which has insulating material thereabout.

It will be understood that the above described embodiments are for purposes of illustration only and changes and modifications may be made thereto without departing from the spirit and scope of the invention.

We claim:

1. A pipe support comprising:
a body having a recess to receive a pipe formed therein, said recess having a generally U-shaped configuration and being open at a top end thereof;
said recess being defined by a bottom wall and first and second sidewalls, said bottom wall having a central linear section, said central linear section terminating at either end in a downwardly sloping portion;
a clamping portion extending downwardly from said body, said clamping portion comprising first and second resilient members;
each of said first and second resilient members comprising a vertical sidewall and an inwardly extending end segment, said vertical sidewalls extending transversly with respect to said sidewalls defining said recess, said vertical sidewalls defining a channel to receive a member to which said pipe support is clamped and wherein said member extends in a direction transverse to said recess in said body.

2. The pipe support of claim 1 wherein said pipe support is formed of a plastic material.

3. The pipe support member of claim 2 wherein said first and second sidewalls defining said recess each have a central portion and a pair of end portions, said central portion extending upwardly from said bottom wall at a greater distance than said end portions.

4. The pipe support of claim 2 further including a plurality of exterior ribs formed on said bottom wall and said first and second sidewalls.

5. The pipe support member of claim 1 wherein each of said downwardly sloping portions has a rounded lip at a free end thereof.

6. The pipe support of claim 5 wherein said bottom wall and said first and second side walls have a textured finish.

7. In a building having a plurality of pipes and longitudinally extending truss members, the improvement comprising a pipe support assembly secured to at least one of said truss members, said pipe support assembly comprising:
a plurality of bodies each body having a recess formed therein, said recesses each being of a generally U-shaped configuration and being open at a top end thereof, each recess having a pipe therein;
each of said recesses being defined by bottom wall and first and second sidewalls, said recesses being in a side by side relationship, said bottom wall having a central linear section, said central linear section terminating at either end in a downwardly sloping portion;
at least one clamping portion extending downwardly from said body, said clamping portion comprising first and second resilient members;
each of said first and second resilient members comprising a vertical sidewall and an inwardly extending end segment, said vertical sidewalls extending transversly with respect to said sidewalls defining said recess, said first and second resilient members defining a channel to receive one of said longitudinally extending truss members, said longitudinally extending truss members extending in a direction transverse to said recesses.

8. The improvement of claim 7 wherein said first and second side walls each have a central portion and a pair of end portions, said central portion extending upwardly from said bottom wall at a greater distance than said end portions.

9. The pipe support of claim 7 wherein an inner surface of said body has a textured finish.

10. The pipe support member of claim 7 wherein each of said end portions slope downwardly and terminate in a rounded lip.

\* \* \* \* \*